Patented Nov. 10, 1925.

1,560,649

UNITED STATES PATENT OFFICE.

JAMES BEVERIDGE, OF RICHMOND, VIRGINIA, ASSIGNOR TO JAMES BROOKES BEVERIDGE, OF RICHMOND, VIRGINIA.

PROCESS OF RECOVERING SODIUM-ACID SULPHITE FROM THE WASTE LIQUORS OF THE SODIUM-ACID-SULPHITE PULP PROCESS.

No Drawing.    Application filed December 12, 1924.   Serial No. 755,435.

*To all whom it may concern:*

Be it known that I, JAMES BEVERIDGE, a subject of the King of Great Britain, and a resident of Richmond, in the county of Henrico and State of Virginia, have invented an Improvement in Processes of Recovering Sodium-Acid Sulphite from the Waste Liquors of the Sodium-Acid-Sulphite Pulp Process, of which the following is a specification.

When wood and other fibrous plants are digested in aqueous solutions of sodium acid sulphite containing varying proportions of sulphur dioxide and generally known as sodium bisulphite, the waste liquors resulting therefrom contain the sodium acid sulphite wholly or in part combined with organic matter derived from the wood.

The general object of the present invention is to subject the said waste liquors to novel treatment whereby the sodium salts shall be recovered and whereby also sodium acid sulphite may be re-formed economically for re-use.

In the carrying out of my invention the waste sodium acid sulphite liquor is drained from the pulp and is divided into two portions, one of which is approximately two-thirds of the volume of said liquor and the other of which is approximately one-third thereof. To the larger portion sodium carbonate, sodium hydroxide or their equivalent is added whereby said portion of waste liquor is brought to a substantially neutral condition.

The neutralized solution is then evaporated to a high density in suitable known apparatus and the concentrated liquor thus produced is then mixed with the one-third portion of unneutralized waste liquor above referred to. The mixture of concentrated liquor and unneutralized waste liquor thus produced is then carbonized in a substantially non-oxidizing atmosphere in a furnace or retort of suitable known construction, which furnace or retort may be heated and maintained at a suitable or proper temperature in any desired known manner. The degree of carbonization should be such that the volatile organic matter associated with the sodium salt or salts shall be driven off and the residue carbonized to such an extent that it will yield when lixiviated or leached in water a clear solution containing substantially all of the sodium sulphite and other sodium salts but little or no soluble organic matter. Care should be taken, however, in the carbonization process that the heat shall not be sufficient to effect or cause the formation of alkali metal sulphides.

Instead of dividing a particular volume of waste sulphite liquor in the manner as above described any desired portion of such liquor may be neutralized in the manner indicated and a proper proportion as above indicated of unneutralized waste liquor added thereto without regard to whether or not both portions originally formed a part of the same volume or batch.

The carbonized material formed or produced in the furnace or retort as above indicated is removed from such furnace or retort and is then lixiviated or leached in water to remove the soluble sodium salts.

The solution thus obtained is then treated with sulphur dioxide in sufficient quantity to re-form sodium acid sulphite.

Having thus described my invention, what I claim and desire to secure by Letters Patent is:

1. The process of treating the waste liquors from the sodium acid sulphite wood pulp process, which comprises the neutralizing of a volume thereof and evaporating the same to a high density, mixing the concentrated liquor thus produced with a portion of unneutralized waste sulphite liquor, then carbonizing the solution thus formed in a substantially non-oxidizing atmosphere, thereafter leaching the carbonized product to remove the soluble contents thereof, and subjecting the aqueous solution of said contents to suitable reactions to convert the same into sodium acid sulphite in aqueous solution.

2. The process of treating the waste liquors from the sodium acid sulphite wood pulp process, which comprises the draining of the waste liquor from the pulp, neutralizing a portion thereof by the addition of a suitable alkali thereto, evaporating the solution thus formed, mixing a portion of unneutralized waste liquor with the concentrated product produced by evaporation, carbonizing the solution thus formed, leaching the carbonized product to remove the soluble contents thereof, and thereafter treating the solution thus produced to effect the formation of sodium acid sulphite.

3. The process of treating the waste liquors from the sodium acid sulphite wood pulp process, which comprises the addition of a suitable alkali to a portion thereof to form a substantially neutral solution, evaporating the solution thus formed to produce a concentrated solution, mixing the said concentrated solution with a portion of unneutralized waste liquor, carbonizing the solution thus formed, leaching the said carbonized product to remove therefrom the soluble contents, and thereafter treating the solution last formed with sulphur dioxide to effect re-formation of sodium acid sulphite.

4. The process of treating the waste liquors from the sodium acid sulphite wood pulp process to reclaim the sodium acid sulphite, which comprises the addition of a suitable alkali to a selected volume thereof to substantially neutralize the same, applying heat thereto to effect evaporation thereof to produce a concentrated solution, mixing an unneutralized portion of said waste liquor with the said concentrated solution, carbonizing the solution thus produced in the presence of a non-oxidizing atmosphere, leaching the carbonized product to remove the soluble contents thereof to form a solution of the same, and thereafter treating the said solution with gaseous sulphur dioxide.

5. The process of treating the waste liquors from the sodium acid sulphite wood pulp process for re-forming sodium acid sulphite, which comprises the dividing of a given portion of said liquor into two parts, one of which is approximately two-thirds of said volume and the other one of which is approximately one-third thereof, adding to the larger volume a suitable alkali to substantially neutralize the same, thereafter evaporating the neutralized solution to form a concentrated neutralized solution, adding the one-third portion of the unneutralized waste liquor to the concentrated solution, thereafter carbonizing the solution thus formed in a substantially non-oxidizing atmosphere, leaching the carbonized product to remove therefrom the soluble contents, and thereafter treating the solution thus obtained with sulphur dioxide to produce sodium acid sulphite.

6. The process of treating the waste liquors from the sodium acid sulphite wood pulp process, which comprises the neutralizing of a volume thereof and evaporating the same to a high density, mixing the concentrated liquor thus produced with a portion of unneutralized waste sulphite liquor, volatilizing the volatile organic matter associated with the sodium salt or salts present in said mixture, carbonizing the residue, leaching the carbonized product to remove the soluble contents thereof to form a solution of the same, and thereafter treating the said solution with a sulphur compound to produce sodium acid sulphite.

In testimony that I claim the foregoing as my invention I have hereunto signed my name this tenth day of December, A. D., 1924.

JAMES BEVERIDGE.